3,057,823
PREPARATION OF POLYESTERS FROM DIALKYL TEREPHTHALATES USING CERTAIN CADMIUM COMPOUNDS AS CATALYSTS
Harry D. McNeil, Jr., Kennett Square, Pa., assignor to Hercules Powder Company, Wilmington, Del., a corporation of Delaware
No Drawing. Filed Feb. 19, 1959, Ser. No. 794,250
3 Claims. (Cl. 260—75)

This invention relates to an improved method for preparing synthetic linear polyesters.

The production of film- and fiber-forming linear polyesters of terephthalic acid and alkylene glycol of the series

HO(CH₂)ₙOH where "n" is an integer from 2 to 10, has been described many times in the art. From a commercial standpoint, probably the most attractive polymer of the above class is poly(ethylene terephthalate) and the most widely used process for its production comprises carrying out an ester interchange between ethylene glycol and dimethyl terephthalate and then polymerizing the resultant glycol terephthalate by splitting off ethylene glycol under reduced pressure at an elevated temperature.

It has long been recognized that in order to obtain a satisfactory rate of reaction in both the aforesaid ester interchange and polymerization, it is necessary to employ a catalyst, and numerous catalysts for this purpose have been proposed. Many of the proposed catalysts are effective in the ester interchange reaction and many of them catalyze the polymerization reaction. However, as a general rule, very few, if any, of the catalysts are effective enough in both reactions to enable their use to the exclusion of other catalysts.

While, as aforesaid, numerous catalysts have been proposed, some of which are effective primarily as ester interchange catalysts and some primarily effective as polymerization catalysts, the art still encounters difficulty in preparing polyesters of satisfactory molecular weight and color in a reasonable length of time. Many catalysts, for instance, promote fast reactions but their use results either in a polymer of too low molecular weight or unsatisfactory color. It is indeed difficult to obtain both satisfactory color and molecular weight in the short periods of time that are desirable for commercial operation.

According to the present invention it has been found that certain cadmium compounds, namely, the oxide and antimonite of cadmium catalyze both the ester interchange between glycols and terephthalate esters and the subsequent polymerization of the intermediate glycol terephthalate and, most importantly, that the use of these cadmium compounds results in a polymer of excellent color and desirably high molecular weight. Significantly, however, the above cadmium compounds must be present during the ester interchange in order to serve effectively as catalysts for the subsequent polymerization; if they are not present during the ester interchange but are added later at the beginning of polymerization, polymers of satisfactory molecular weight cannot be obtained in a reasonable time. Accordingly, the invention is directed to an improvement in the process for producing poly(alkylene terephthalates) wherein an alkylene glycol is reacted under ester interchange conditions with a dialkyl terephthalate, and the resulting glycol terephthalate is polymerized by splitting off of glycol, which improvement comprises carrying out both the ester interchange reaction and polymerization in the presence of a catalytic amount of a compound selected from the group consisting of cadmium oxide and cadmium antimonite.

As inferred from the above explanation, no catalyst other than one of the specified cadmium compounds is necessary in the practice of the invention but this does not preclude the employment of one or more additional catalysts either to promote the ester interchange or the polymerization reaction. In fact, one of the preferred embodiments of the invention provides for the employment along with the cadmium compound of an alkaline earth meal or magnesium acetate as an auxiliary ester interchange catalyst. Certain benefits are realized for this embodiment, particularly a slight increase in the speed of the ester interchange reaction and a lowering of catalyst cost.

The following examples are presented as illustrative of the invention. Parts and percentages throughout are by weight unless otherwise specified. Intrinsic viscosities in the examples were determined at 25° C. on a 1% solution of polymer in a 60:40 blend of phenol and tetrachloroethane.

To aid in understanding of the examples, the polymer characteristics which are optimum for film and fiber manufacture and which are sought for are:

Intrinsic viscosity _____ 0.5 to 1.0
Birefringent melting point _____ >255° C.
Color—as nearly white as possible.

EXAMPLE 1

Into a reaction vessel equipped with a distillation column and agitator there was placed 436.5 parts of dimethyl terephthalate, 251.1 parts of ethylene glycol and 0.165 part of cadmium oxide (CdO). This mixture of reactants was then heated under agitation and ester interchange began to take place when the temperature inside the reaction vessel reached about 135° C. Distillation of methanol from the vessel took place rapidly and as the reaction progressed the temperature was increased gradually to maintain the rate of methanol evolution. Finally after a period of five hours the reaction temperature reached 231° C., at which time 137 parts of methanol had been evolved and collected. The water white product of ester interchange, consisting essentially of bis(hydroxy ethyl terephthalate) and low molecular weight polymers of this compound having an average degree of polymerization of less than 4, was then cooled to 200° C. and poured from the vessel. Analysis showed a methoxyl content of 0.1%.

Next 15 parts of the ester interchange product was placed in a sealed vertical tubular reactor provided with a nitrogen sparge and an evacuation outlet. While reducing the pressure to 13 mm. Hg the ester interchange product was heated over a period of one-half hour to its melting point (about 200° C.) and the nitrogen sparge was started. The reactor was further evacuated gradually to a pressure of about 1 mm. Hg. The temperature was next increased to 285° C. over a period of 1.5 hours and the temperature held at this last point for three hours, while maintaining a pressure of 3.6–3.9 mm. Hg. The resulting viscous polymer melt was allowed to cool to room temperature at 3.6 mm. Hg pressure with nitrogen sparge until solidification took place.

The final polymer upon removal from the reactor had an intrinsic viscosity of 0.72 and a birefringent melting point of 268° C. The solidified polymer was nearly white having only a slight yellowish tint.

EXAMPLES 2–4

The procedure of Example 1 was followed in additional experiments involving the substitution of another catalyst or catalysts for the cadmium oxide of Example 1. In each case the initial reactants consisted of 436.5 parts of dimethyl terephthalate and 251.1 parts of ethylene glycol. The following table describes the reactions and the products obtained. Examples A and B are included for comparative purposes.

Table I

| Ex. No. | Ester interchange | | | | | Polymerization | | | | | Product | | |
|---|---|---|---|---|---|---|---|---|---|---|---|---|---|
| | Catalyst | Catalyst (parts) | Temp. range (° C) | Time (hrs.) | Product (percent) methoxyl | Catalyst [1] | Catalyst (parts/ 15 parts polymer) | Pressure mm. Hg 250– 285° C. | Time heatup (hrs.) | Time at 285°C (hrs.) | Color | Intrinsic viscosity | Bi-refringent melting point |
| 2 | Barium acetate | 0.63 | 150–238 | 3.35 | (²) | None | | 2.8 | 1.5 | 3.25 | White | 0.664 | 266 |
|   | Cd(SbO₂)₂ | 0.1 | | | | | | | | | | | |
| 3 | Magnesium acetate. | 0.63 | 145–232 | 4.0 | 0.02 | ...do | | 2.15–3.20 | 1.75 | 3.0 | Yellowish white. | 0.71 | 268 |
|   | Cadmium oxide | 0.1 | | | | | | | | | | | |
| 4 | Barium acetate | 0.63 | 140–231 | 3.0 | (²) | ...do | | 3.3–4.05 | 1.3 | 3.0 | White | 0.50 | 268 |
|   | Cadium oxide | 0.05 | | | | | | | | | | | |
| A | Barium acetate | 0.63 | 151–231 | 3.5 | 0.04 | CdO | 0.00107 | 3.5–3.8 | 1.2 | 3.0 | Yellowish white | 0.42 | 268 |
| B | ...do | 0.63 | 151–231 | 3.5 | 0.04 | None | | 0.35–3.25 | 1.5 | 3.3 | Off-white | 0.37 | 268 |

[1] Added at beginning of polymerization.  ² Not determined.

As seen from the examples, the process of the invention as illustrated in Examples 1–4 leads to the formation of polymers of satisfactory molecular weight and excellent color in reasonably short reaction periods. However, when the cadmium catalyst is added at the start of the polymerization reaction instead of initially, polymers of satisfactory molecular weight are not obtained as shown in comparative Example A. The result, in fact, is substantially no better than when the cadmium catalyst is omitted entirely as per comparative Example B.

The process of the invention is characterized by reacting a dialkyl terephthalate and an alkylene glycol under ester interchange conditions and then polymerizing the resulting glycol terephthalate by splitting off of glycol to form a high molecular weight linear polyester in the presence throughout of a catalytic amount of compound selected from the group consisting of cadmium oxide and cadmium antimonite.

The distinguishing feature of the invention is the employment of the specified cadmium catalyst; other details of the process are as already known to the art. Typically, the initial ester interchange can be conveniently carried out by reacting the terephthalate esters and glycol in molar proportions of about 0.25 to 0.7 mole of the former to each mole of the latter at atmospheric pressure at a temperature between 100 and 260° C., preferably between 135–235° C. It may also be carried out at pressures above and below atmospheric pressure if desired.

The product from the ester interchange is normally a mixture of bis(hydroxyalkyl terephthalate) and low molecular polymers of this compound having an average degree of polymerization of less than 4, such products being commonly defined in the art as "glycol terephthalates."

As is also conventional in the art, polymerization of the ester interchange product is effected in the liquid phase at a reduced pressure in the vicinity of 0.05–20 mm. Hg, more preferably within the range of 0.5–5 mm. Hg, for optimum results, reduced pressure being necessary to remove glycol which is split off as a result of condensation. A temperature between 230–290° C. is desirable and should be maintained during the polymerization which is carried out until a polymer of desired molecular weight is obtained.

While dimethyl terephthalate and ethylene glycol are the preferred starting materials for the practice of the invention, other dialkyl terephthalates in which the alkyl groups contain not more than 4 carbon atoms, e.g., diethyl, di-n-propyl and di-n-butyl terephthalates can be used and likewise alkylene glycols having up to 10 carbon atoms can be employed. These are the essential reactants but it is not intended to exclude other modifying reactants such as dialkyl ortho- and isophthalates and the like since these can be employed to replace a part of the dialkyl terephthalate to effect a slight to moderate alteration of final polymer properties.

From the standpoint of accelerating the reactions involved, the amount of catalyst is not an important factor. However, it is desirable to keep the amount of catalyst as low as possible in order to achieve optimum color. With these considerations in mind, the total amount of catalyst employed in the invention should be less than about 0.5% of the combined weight of starting reactants, preferably from 0.1 to 0.025%. As already explained, the total catalyst need not consist entirely of one of the specified cadmium compounds but may be a mixture of an alkaline earth metal or magnesium acetate and one or more of the specified cadmium compounds. In such case, the presence of at least 0.005% of cadmium compound based on the weight of reactants is essential to obtain the benefits of the invention.

What I claim and desire to protect by Letters Patent is:

1. In the process for producing high molecular weight polyesters having an intrinsic viscosity of from 0.5 to 1.0 at 25° C. and a birefringent melting point of at least 255° C. wherein an alkylene glycol having from 2 to 10 carbon atoms is reacted under ester interchange conditions with a dialkyl terephthalate in which each alkyl group has from 1 to 4 carbon atoms and the resulting glycol terephthalate is polymerized by splitting off of glycol, the improvement which comprises carrying out both the ester interchange reaction and polymerization in the presence of a catalytic amount of cadmium oxide.

2. The process of claim 1 wherein dimethyl terephthalate is reacted with ethylene glycol.

3. The process of claim 1 wherein the amount of cadmium compound comprises from 0.5 to 0.005% of the reactants.

References Cited in the file of this patent

UNITED STATES PATENTS

| 2,465,319 | Whinfield | Mar. 22, 1949 |
| 2,578,660 | Auspos | Dec. 18, 1951 |
| 2,681,360 | Vondonik | June 15, 1954 |

FOREIGN PATENTS

| 792,011 | Great Britain | Mar. 19, 1958 |